United States Patent
Sato et al.

(10) Patent No.: US 11,279,426 B2
(45) Date of Patent: Mar. 22, 2022

(54) VEHICLE AND CONTROL METHOD THEREOF

(71) Applicant: HONDA MOTOR CO., LTD., Tokyo (JP)

(72) Inventors: Takashi Sato, Tokyo (JP); Shogo Tatsumi, Tokyo (JP); Akiyuki Suzuki, Tokyo (JP); Shogo Nishida, Tokyo (JP); Takayuki Abe, Tokyo (JP); Takaya Kakimoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/174,421

(22) Filed: Feb. 12, 2021

(65) Prior Publication Data

US 2021/0276650 A1    Sep. 9, 2021

(30) Foreign Application Priority Data

Mar. 9, 2020    (JP) .............................. JP2020-039906

(51) Int. Cl.
*B62J 3/10* (2020.01)
*B60Q 5/00* (2006.01)

(52) U.S. Cl.
CPC ................ *B62J 3/10* (2020.02); *B60Q 5/006* (2013.01)

(58) Field of Classification Search
CPC .................................. B62J 3/10; B60Q 5/006
See application file for complete search history.

(56) References Cited

U.S. PATENT DOCUMENTS

| | | | | |
|---|---|---|---|---|
| 5,188,445 A | * | 2/1993 | Haun | B60Q 1/2611 |
| | | | | 116/147 |
| 5,754,099 A | | 5/1998 | Nishimura et al. | |
| 6,278,360 B1 | * | 8/2001 | Yanagi | B60Q 1/525 |
| | | | | 340/436 |
| 9,799,223 B2 | * | 10/2017 | Nespolo | B60Q 5/006 |
| 2009/0033475 A1 | * | 2/2009 | Zuziak | B62J 3/00 |
| | | | | 340/432 |
| 2010/0315216 A1 | * | 12/2010 | Hada | B60Q 9/008 |
| | | | | 340/436 |
| 2017/0162054 A1 | * | 6/2017 | Nespolo | B60Q 9/008 |
| 2018/0079463 A1 | * | 3/2018 | Pearce | B62J 27/00 |
| 2018/0208112 A1 | * | 7/2018 | Tayama | G08G 1/16 |
| 2019/0100198 A1 | | 4/2019 | Hakki et al. | |

(Continued)

FOREIGN PATENT DOCUMENTS

| | | |
|---|---|---|
| DE | 102005060722 A1 | 6/2007 |
| DE | 102007053274 A1 | 5/2009 |

(Continued)

OTHER PUBLICATIONS

Examination Report for German Patent Application No. 102021104924.5 dated Nov. 16, 2021.

(Continued)

*Primary Examiner* — Ojiako K Nwugo
(74) *Attorney, Agent, or Firm* — Thomas | Horstemeyer, LLP

(57) ABSTRACT

The present invention provides a vehicle comprising: a detection unit configured to detect an obstacle invading a predetermined region in front of a self-vehicle; and an output control unit configured to control output of an alarm to the obstacle in a case where the obstacle is detected by the detection unit.

8 Claims, 3 Drawing Sheets

(56) References Cited

U.S. PATENT DOCUMENTS

| | | | | |
|---|---|---|---|---|
| 2020/0189534 A1* | 6/2020 | Jeon | ............... | B60Q 1/525 |
| 2020/0398743 A1* | 12/2020 | Huber | ............... | B60Q 5/006 |
| 2021/0118303 A1* | 4/2021 | Chan | ............... | G08G 1/005 |
| 2021/0180373 A1* | 6/2021 | Goriesky | ............... | B60Q 9/008 |
| 2021/0206315 A1* | 7/2021 | Fassbender | ............... | B60Q 5/006 |
| 2021/0238827 A1* | 8/2021 | Ries | ............... | B60R 1/00 |

FOREIGN PATENT DOCUMENTS

| | | | |
|---|---|---|---|
| JP | H05087923 A | 4/1993 |
| JP | H07-057181 A | 3/1995 |
| JP | H07262499 A | 10/1995 |
| JP | 2002178864 A | 6/2002 |

OTHER PUBLICATIONS

Search Report for German Patent Application No. 102021104924.5 dated Nov. 16, 2021.

Japanese Office Action for Japanese Patent Application No. 2020-039906 dated Nov. 15, 2021 (partially translated).

\* cited by examiner

VEHICLE AND CONTROL METHOD THEREOF

CROSS-REFERENCE TO RELATED APPLICATION(S)

This application claims priority to and the benefit of Japanese Patent Application No. 2020-039906 filed on Mar. 9, 2020, the entire disclosure of which is incorporated herein by reference.

BACKGROUND OF THE INVENTION

Field of the Invention

The present invention relates to a vehicle and a control method thereof.

Description of the Related Art

Japanese Patent Laid-Open No. H07-057181 discloses taking risk avoidance measures if a scan type radar device detects an obstacle invading in front of a self-vehicle. Examples of the risk avoidance measures are automatic deceleration, alarm, and lighting of a lamp.

Even if an obstacle invading in front of the self-vehicle is detected, giving an alarm to the obstacle may be inappropriate depending on the situation.

SUMMARY OF THE INVENTION

The present invention provides, for example, a technique of appropriately giving an alarm to an obstacle invading in front of a self-vehicle.

According to one aspect of the present invention, there is provided a vehicle comprising: a detection unit configured to detect an obstacle invading a predetermined region in front of a self-vehicle; and an output control unit configured to control output of an alarm to the obstacle in a case where the obstacle is detected by the detection unit.

Further features of the present invention will become apparent from the following description of exemplary embodiments with reference to the attached drawings.

DESCRIPTION OF THE EMBODIMENTS

Figure 1:
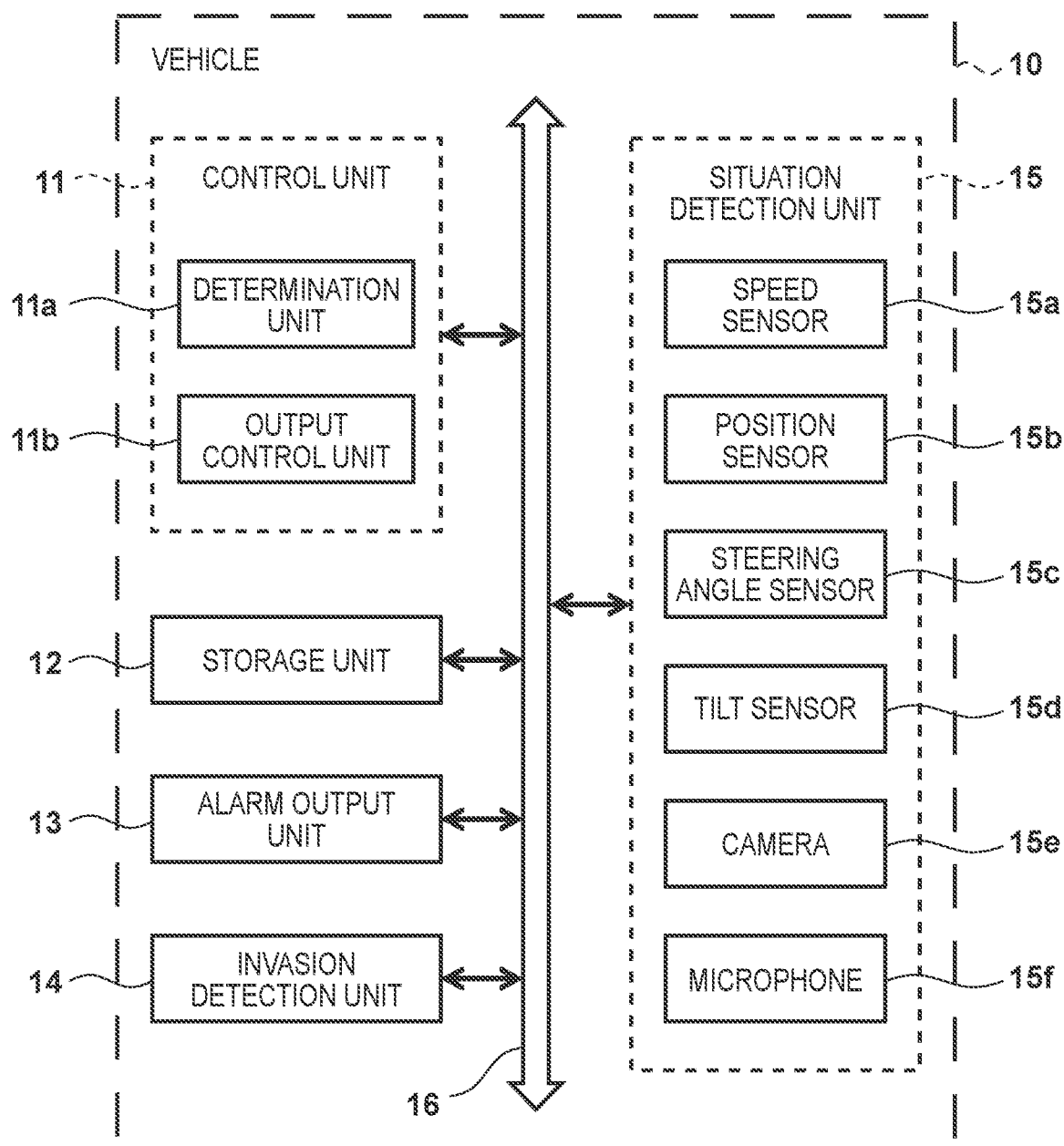
FIG. 1 is a block diagram showing an example of the arrangement of a vehicle.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

The first embodiment of the present invention will be described. FIG. 1 is a block diagram showing the system configuration of a straddle type vehicle 10. In this embodiment, a motorcycle will be exemplified as the straddle type vehicle 10. However, the present invention can also be applied to a four-wheeled vehicle or a straddle type vehicle of another type such as a three-wheeled vehicle. Note that the straddle type vehicle 10 will sometimes be simply referred to as the "vehicle 10" hereinafter.

The vehicle 10 includes, for example, a control unit 11, a storage unit 12, an alarm output unit 13, an invasion detection unit 14, and a situation detection unit 15, which are communicably connected to each other via a system bus 16. The control unit 11 is, for example, an ECU (Electronic Control unit), and includes a processor represented by a CPU, a storage device such as a semiconductor memory, an interface to an external device, and the like, and controls each unit of the vehicle 10. The storage unit 12 stores programs, data, and the like used to control the vehicle 10, and the control unit 11 (processor) can read out the programs stored in the storage unit to the storage device such as a memory and execute them.

Also, the control unit 11 according to this embodiment is provided with a determination unit 11a and an output control unit 11b. When the invasion detection unit 14 detects an obstacle, the determination unit 11a determines whether an alarm to the obstacle is unnecessary or not. The output control unit 11b controls the output of an alarm (alarm sound) by the alarm output unit 13 based on the determination result of the determination unit 11a. For example, if the invasion detection unit 14 detects an obstacle, but the determination unit 11a determines that alarm output is unnecessary, the output control unit 11b does not output an alarm.

The alarm output unit 13 outputs an alarm by generating an alarm sound to the outside of the vehicle or lighting a lamp. In this embodiment, the alarm output unit 13 is a horn device (horn), and outputs an alarm sound to the outside of the vehicle. The invasion detection unit 14 is provided in the front portion of the vehicle 10, and detects an obstacle (for example, a cut-in vehicle) invading a predetermined region in front of the self-vehicle. In this embodiment, an ultrasonic sensor can be used as the invasion detection unit 14. However, the sensor is not limited to this, and another sensor such as a camera, a millimeter wave radar, or a laser radar may be used.

The situation detection unit 15 detects the situation of at least one of the vehicle 10 (self-vehicle) and the obstacle detected by the invasion detection unit 14. In this embodiment, the situation detection unit 15 can include a speed sensor 15a, a position sensor 15b, a steering angle sensor 15c, a tilt sensor 15d, a camera 15e, and a microphone 15f. The speed sensor 15a detects the speed of the vehicle 10. The position sensor 15b includes, for example, a GPS sensor, and detects the current position of the vehicle 10. The steering angle sensor 15c detects the steering angle of the vehicle 10. The tilt sensor 15d detects the tilt (bank angle) of the vehicle 10. The camera 15e captures the periphery (for example, in front) of the vehicle 10. The microphone 15f acquires sounds outside the vehicle.

Figure 2:
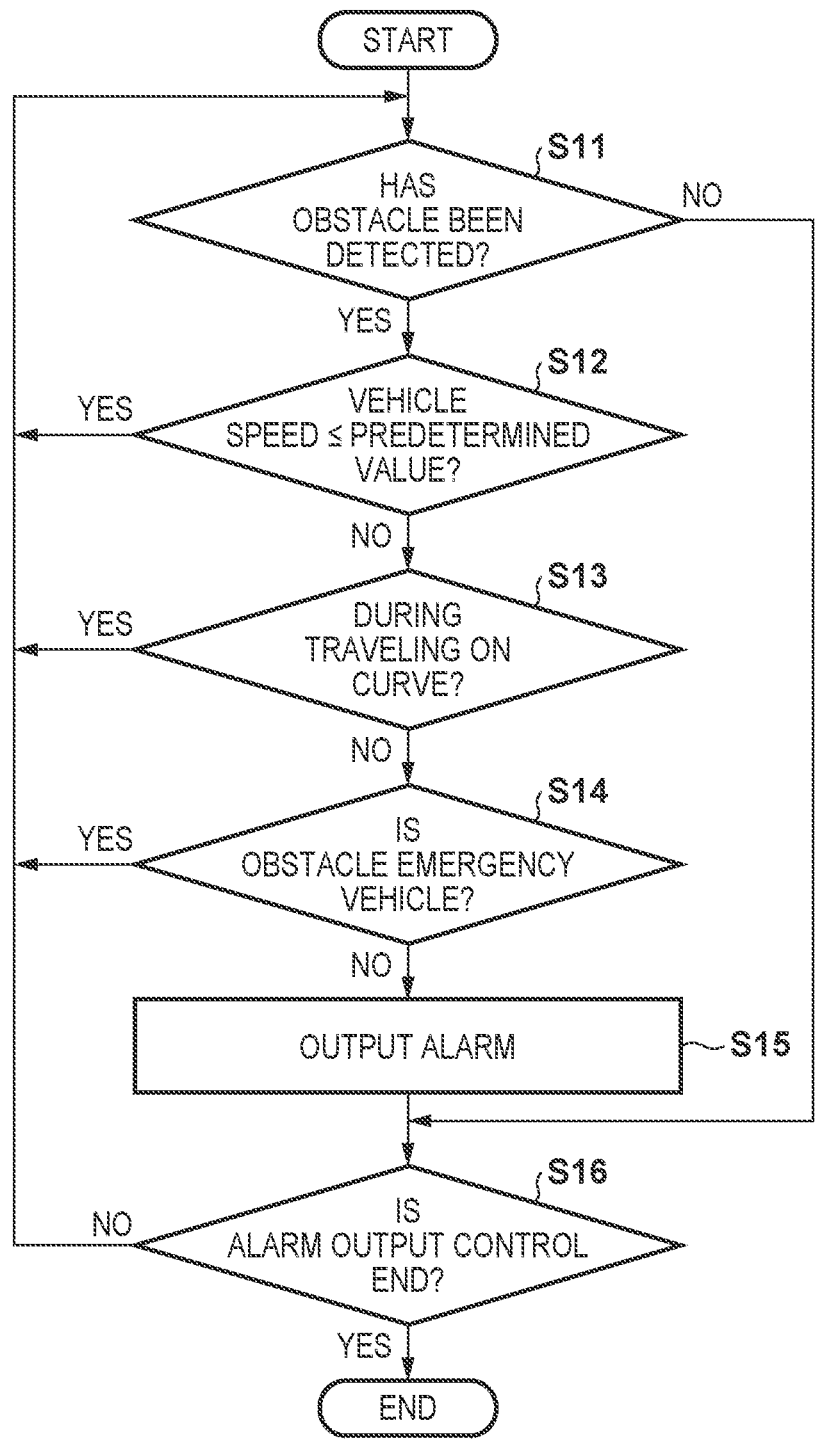
FIG. 2 is a flowchart showing processing of alarm output control.

Alarm output control of the vehicle 10 according to this embodiment will be described next. FIG. 2 is a flowchart showing processing of alarm output control. Each step of the flowchart shown in FIG. 2 can be executed by the control unit 11.

In step S11, the control unit 11 determines whether the invasion detection unit 14 detects an obstacle invading a predetermined region R in front of the vehicle 10. For example, if a change from a state in which the invasion detection unit 14 does not detect an obstacle to a state in which the invasion detection unit 14 detects an obstacle occurs, the control unit 11 can determine that an obstacle has invaded the predetermined region R. If the invasion detection unit 14 detects an obstacle, the process advances to step S12. If the invasion detection unit 14 does not detect an obstacle, the process advances to step S16.

Figure 3:
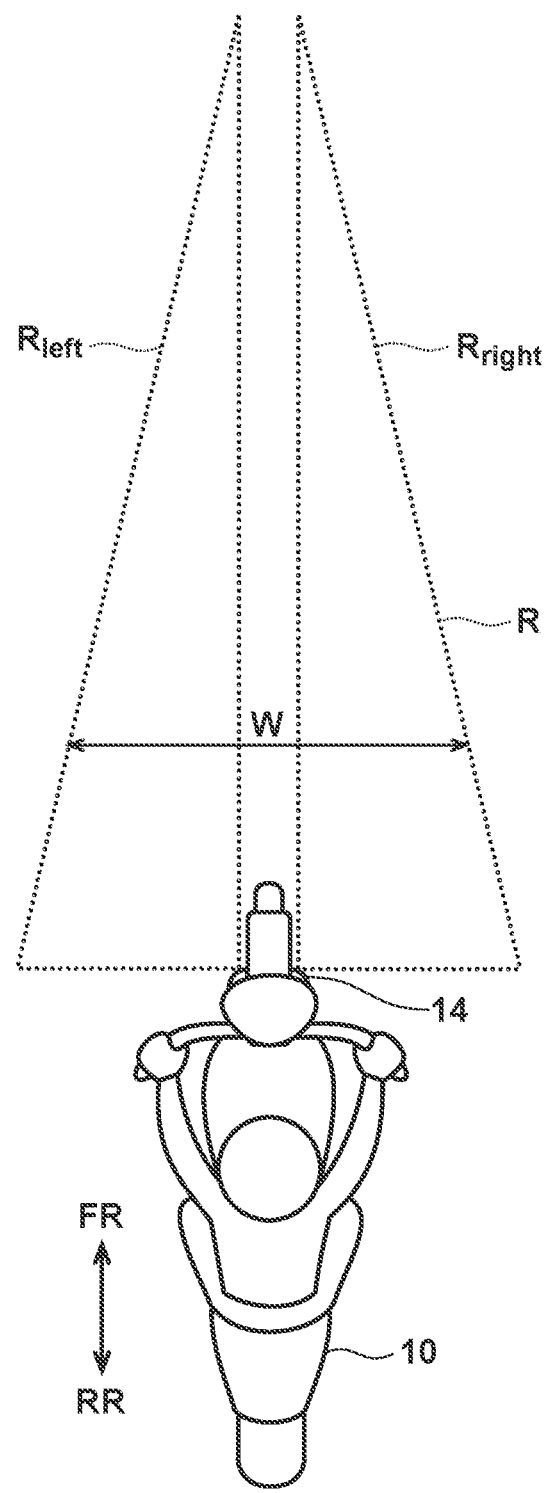
FIG. 3 is a view showing a predetermined region to detect an obstacle.

The predetermined region R configured to detect an obstacle will be described here. The predetermined region R is a region where an obstacle invading (cutting in) in front of the self-vehicle is detected by the invasion detection unit 14. For example, the closer the obstacle is to the self-vehicle, the higher the degree of influence of cut-in of an obstacle on the self-vehicle tends to be. For this reason, an alarm is preferably actively made when cut-in of an obstacle occurs near the self-vehicle. Hence, in this embodiment, as shown in FIG. 3, the predetermined region R can be set such that the range (width W) in the vehicle width direction becomes narrow as the distance from the vehicle 10 increases (as the distance increases in the traveling direction of the vehicle 10). When the predetermined region R is set in this way, the closer the position of cut-in of an obstacle is to the self-vehicle, the more actively an alarm can be given. Note that in FIG. 3, FR indicates in front of the vehicle 10, and RR indicates the rear side of the vehicle 10.

In step S12, the control unit 11 (determination unit 11a) determines whether the speed of the self-vehicle (vehicle 10) is equal to or less than a predetermined value. For example, if the self-vehicle is at a stop, or if the self-vehicle is traveling at a low speed (for example, 10 km/h or less), the degree of risk is relatively not high even if the obstacle cuts in front of the self-vehicle. For this reason, it is often unnecessary to give an alarm to the cut-in vehicle (obstacle). Hence, based on the speed of the self-vehicle detected by the speed sensor 15a, if the speed of the self-vehicle is equal to or less than a predetermined value (for example, 10 km/h or less), the determination unit 11a determines that an alarm is unnecessary, and the process returns to step S11. On the other hand, if the speed of the self-vehicle is larger than the predetermined value, the process advances to step S13.

In step S13, the control unit (determination unit 11a) determines whether the self-vehicle is traveling on a curve. For example, if the self-vehicle is traveling on a curve, an object different from a cut-in vehicle, such as a road surface, a sign on a road, or a guardrail enters the predetermined region R, and the invasion detection unit 14 may cause a detection error. For this reason, if the self-vehicle is traveling on a curve, the determination unit 11a determines that an alarm is unnecessary, and the process returns to step S11. On the other hand, if the self-vehicle is not traveling on a curve, the process advances to step S14.

Here, whether the self-vehicle is traveling on a curve can be determined based on, for example, the detection result of the steering angle sensor 15c and/or the tilt sensor 15d. More specifically, if the steering angle of the self-vehicle detected by the steering angle sensor 15c is larger than a predetermined angle, and/or the tilt (bank angle) of the self-vehicle detected by the tilt sensor 15d is larger than a predetermined angle, the determination unit 11a can determine that the self-vehicle is traveling on a curve. Alternatively, whether the self-vehicle is traveling on a curve may be determined based on the detection result of the position sensor. In this case, the determination unit 11a can determine whether the self-vehicle is traveling on a curve by collating the current position of the self-vehicle detected by the position sensor 15b with map information.

In step S14, the control unit 11 (determination unit 11a) determines whether the obstacle (cut-in vehicle) detected by the invasion detection unit 14 is an emergency vehicle. This is because giving an alarm is not preferable if the cut-in vehicle is an emergency vehicle. For example, the determination unit 11a uses a known image processing technique for an image obtained by capturing the periphery (in front) of the self-vehicle by the camera 15e, thereby determining whether the obstacle detected by the invasion detection unit 14 is an emergency vehicle. Alternatively, the determination unit 11a may determine, based on a sound outside the vehicle, which is acquired by the microphone 15f, whether the obstacle detected by the invasion detection unit 14 is an emergency vehicle. More specifically, if a siren of an emergency vehicle is acquired by the microphone 15f when the invasion detection unit 14 detects an obstacle, the determination unit 11a can determine that the obstacle is an emergency vehicle. Upon determining that the obstacle detected by the invasion detection unit 14 is an emergency vehicle, it is determined that an alarm is unnecessary, and the process returns to step S11. On the other hand, upon determining that the obstacle detected by the invasion detection unit 14 is not an emergency vehicle, the process advances to step S15.

In step S15, the control unit 11 (output control unit 11b) causes the alarm output unit 13 to output an alarm (alarm sound). Here, the output control unit 11b may change the output form (output method) of the alarm from the alarm output unit 13 in accordance with the distance between the cut-in vehicle and the self-vehicle. For example, the output control unit 11b may control the output of the alarm from the alarm output unit 13 such that the shorter the distance between the cut-in vehicle and the self-vehicle is, the larger the volume of the alarm sound is (that is, the longer the distance is, the smaller the volume of the alarm sound is). In addition, the output control unit 11b may control the output of the alarm from the alarm output unit 13 such that the shorter the distance between the cut-in vehicle and the self-vehicle is, the longer the output time of the alarm sound is (that is, the longer the distance is, the shorter the output time of the alarm sound is). The output time of an alarm sound is the time (period) of generating an alarm sound. During this time, the alarm sound may be output intermittently or continuously.

In step S16, the control unit 11 determines whether to end the alarm output control. For example, if an ignition switch is turned off by the driver, the control unit 11 can determine to end the alarm output control. If the alarm output control is not to be ended, the process returns to step S11.

As described above, if an obstacle invading the predetermined region R in front of the self-vehicle is detected by the invasion detection unit 14, the vehicle 10 (control unit 11) according to this embodiment determines whether an alarm to the obstacle is unnecessary, and controls output of an alarm based on the determination result. Since this can prevent an alarm from being automatically output even if an alarm is unnecessary, an alarm can be appropriately output in accordance with the situation of the self-vehicle and/or the situation of the obstacle invading in front of the self-vehicle. Here, in this embodiment, an example in which if the invasion detection unit 14 detects an obstacle invading the predetermined region R, the determination unit 11a determines whether an alarm to the obstacle is unnecessary has been described. However, the present invention is not limited to this, and the determination by the determination unit 11a may not be performed. For example, the determination unit 11a does not determine whether an alarm is unnecessary, and if an obstacle invading the predetermined region R is detected by the invasion detection unit 14, an alarm may be given to the target.

Second Embodiment

The second embodiment of the present invention will be described. In this embodiment, another example in which alarm output control is performed in a case in which a self-vehicle (vehicle 10) is traveling on a curve will be described. This embodiment basically takes over the first embodiment, and alarm output control according to this embodiment can be performed in accordance with the flowchart shown in FIG. 2. However, in the process of step S13 of the flowchart shown in FIG. 2, processing to be described below can be performed.

When a vehicle is traveling on a curve, generally, cut-in tends to occur more readily from the outer side of the curve rather than from the inner side of the curve. In a predetermined region R where an invasion detection unit 14 detects an obstacle, a detection error tends to occur less on the outer side of the curve rather than on the inner side of the curve. For this reason, if a control unit 11 (determination unit 11*a*) according to this embodiment determines in step S13 that the self-vehicle is traveling on a curve, and an obstacle invading from the inner side of the curve into the predetermined region R is detected by the invasion detection unit 14, it is determined that an alarm is unnecessary, and the process returns to step S11. On the other hand, if an obstacle invading from the outer side of the curve into the predetermined region R is detected by the invasion detection unit 14, it is determined that an alarm is necessary, and the process advances to step S14.

A detailed example of this embodiment will be described here. For example, the predetermined region R where the invasion detection unit 14 detects an obstacle can be set to include a right-side region $R_{right}$ where an obstacle invading from the right side of the vehicle is detected and a left-side region $R_{left}$ where an obstacle invading from the left side of the vehicle is detected, as shown in FIG. 3. In this case, the determination unit 11*a* determines, based on the detection result of a steering angle sensor 15*c*, a tilt sensor 15*d*, a position sensor 15*b*, or the like, in which one of the left and right directions the curve on which the vehicle 10 is traveling bends. Upon determining that the vehicle 10 is traveling on a curve bending in the left direction, if an obstacle invading the left-side region $R_{left}$ that is the inner side of the curve is detected, the determination unit 11*a* determines that an alarm is unnecessary. If an obstacle invading the right-side region $R_{right}$ that is the outer side of the curve is detected, the determination unit 11*a* determines that an alarm is necessary. On the other hand, upon determining that the vehicle 10 is traveling on a curve bending in the right direction, if an obstacle invading the right-side region $R_{right}$ that is the inner side of the curve is detected, the determination unit 11*a* determines that an alarm is unnecessary. If an obstacle invading the left-side region $R_{left}$ that is the outer side of the curve is detected, the determination unit 11*a* determines that an alarm is necessary.

As described above, if an obstacle invading from the inner side of a curve is detected by the invasion detection unit 14, the vehicle 10 (control unit 11) according to this embodiment determines that an alarm is unnecessary. If an obstacle invading from the outer side of a curve is detected by the invasion detection unit 14, the vehicle 10 (control unit 11) determines that an alarm is necessary. Hence, concerning the inner side of a curve, it is possible to prevent output of an alarm by a detection error. For the outer side of a curve, where cut-in readily occurs as compared to the inner side of the curve, an alarm can actively be output.

Summary of Embodiment

1. A vehicle (10) according to the above-described embodiment comprises a detection unit (14) configured to detect an obstacle invading a predetermined region (R) in front of a self-vehicle, and an output control unit (11*b*) configured to control output of an alarm to the obstacle in a case where the obstacle is detected by the detection unit.

According to this embodiment, the predetermined region configured to detect an obstacle as a target of alarm output is provided in front of the self-vehicle, thereby appropriately outputting the alarm to the obstacle invading in front of the self-vehicle.

2. In the above-described embodiment, the vehicle further comprises a determination unit (11*a*) configured to determine whether an alarm to the obstacle is unnecessary in a case where the obstacle is detected by the detection unit, wherein the output control unit controls the output of the alarm based on a determination result of the determination unit.

According to this embodiment, in a case in which an obstacle invading the predetermined region in front of the self-vehicle is detected, it is possible to prevent an alarm from being automatically output even if an alarm is unnecessary. That is, it is possible to appropriately output an alarm in accordance with the situation of the self-vehicle and/or the situation of the obstacle invading in front of the self-vehicle.

3. In the above-described embodiment, in a case where the obstacle is detected by the detection unit, but the determination unit determines that the alarm is unnecessary, the output control unit does not output the alarm.

According to this embodiment, in a case in which an obstacle invading the predetermined region in front of the self-vehicle is detected, it is possible to prevent an alarm from being automatically output even if an alarm is unnecessary.

4. In the above-described embodiment, in a case where a speed of the self-vehicle is not more than a predetermined value, the determination unit determines that the alarm is unnecessary.

According to this embodiment, if the self-vehicle is at a stop, or if the self-vehicle is traveling at a low speed, an alarm is unnecessary in many cases. Hence, it is possible to prevent an alarm from being automatically output in that case.

5. In the above-described embodiment, in a case where the self-vehicle is traveling on a curve, the determination unit determines that the alarm is unnecessary.

According to this embodiment, during traveling on a curve, a detection error of an obstacle in the predetermined region in front of the self-vehicle may occur. Hence, it is possible to prevent an alarm from being automatically output in that case.

6. In the above-described embodiment, while the self-vehicle is traveling on a curve, in a case where an obstacle invading from an inner side of the curve is detected by the detection unit, the determination unit determines that the alarm is unnecessary, and in a case where an obstacle invading from an outer side of the curve is detected by the detection unit, the determination unit determines that the alarm is necessary.

According to this embodiment, during traveling on a curve, concerning the inner side of the curve, it is possible to prevent output of an alarm by a detection error of an obstacle. For the outer side of the curve, where cut-in readily occurs as compared to the inner side of the curve, an alarm can actively be output.

7. In the above-described embodiment, in a case where the obstacle detected by the detection unit is an emergency vehicle, the determination unit determines that the alarm is unnecessary.

According to this embodiment, if an obstacle invading in front of the self-vehicle is an emergency vehicle, it is possible to prevent output of an alarm to the emergency vehicle.

8. In the above-described embodiment, the predetermined region is a region where the obstacle invading in front of the self-vehicle is detected by the detection unit, and a range of the predetermined region in a vehicle width direction is set to be narrow as a distance from the vehicle increases.

According to this embodiment, the closer the position of cut-in of an obstacle is to the self-vehicle, the more actively an alarm can be given.

9. In the above-described embodiment, the output control unit changes an output form of the alarm in accordance with a distance between the self-vehicle and an obstacle detected by the detection unit.

According to this embodiment, since the degree of influence on the self-vehicle changes depending on the distance between the self-vehicle and the obstacle detected by the detection unit, it is possible to appropriately output an alarm in accordance with the degree of influence.

10. In the above-described embodiment, the vehicle is a straddle type vehicle.

According to this embodiment, in a straddle type vehicle for which cut-in readily occurs as compared to a four-wheeled vehicle, the advantage of outputting an alarm to a cut-in vehicle is high.

11. A control method of a vehicle according to the above-described embodiment comprises detecting an obstacle invading a predetermined region in front of a self-vehicle (S11), and controlling output of an alarm to the obstacle in a case where the obstacle is detected in the detection (S15).

According to this embodiment, the predetermined region configured to detect an obstacle as a target of alarm output is provided in front of the self-vehicle, thereby appropriately outputting the alarm to the obstacle invading in front of the self-vehicle.

The invention is not limited to the foregoing embodiments, and various variations/changes are possible within the spirit of the invention.

What is claimed is:

1. A vehicle comprising:
   a detection unit configured to detect an obstacle invading a predetermined region in front of a self-vehicle;
   a determination unit configured to determine, in a case where the obstacle is detected by the detection unit, whether an alarm to the detected obstacle is necessary or unnecessary; and
   an output control unit configured to output the alarm to the detected obstacle in a case where the determination unit determines that the alarm to the detected obstacle is necessary,
   wherein while the self-vehicle is traveling on a curve,
      in a case where an obstacle invading from an inner side of the curve is detected by the detection unit, the determination unit determines that the alarm to the detected obstacle is unnecessary, and
      in a case where an obstacle invading from an outer side of the curve is detected by the detection unit, the determination unit determines that the alarm to the detected obstacle is necessary.

2. The vehicle according to claim 1, wherein even if the obstacle is detected by the detection unit, the output control unit does not output the alarm to the detected obstacle in a case where the determination unit determines that the alarm to the detected obstacle is unnecessary.

3. The vehicle according to claim 1, wherein in a case where a speed of the self-vehicle is not more than a predetermined value, the determination unit determines that the alarm to the detected obstacle is unnecessary.

4. The vehicle according to claim 1, wherein the determination unit judges whether the obstacle detected by the detection unit is an emergency vehicle that emits a siren, and determines, in a case of judging that the detected obstacle is the emergency vehicle, that the alarm to the detected obstacle is unnecessary.

5. The vehicle according to claim 1, wherein
   the predetermined region is a region where the obstacle invading in front of the self-vehicle is detected by the detection unit, and
   a range of the predetermined region in a vehicle width direction is set to be narrower as a distance from the vehicle increases.

6. The vehicle according to claim 1, wherein the output control unit changes an output form of the alarm in accordance with a distance between the self-vehicle and an obstacle detected by the detection unit.

7. The vehicle according to claim 1, wherein the vehicle is a straddle type vehicle.

8. A control method of a vehicle, the method comprising:
   detecting an obstacle invading a predetermined region in front of a self-vehicle;
   determining, in a case where the obstacle is detected in the detecting, whether an alarm to the detected obstacle is necessary or unnecessary; and
   outputting the alarm to the detected obstacle in a case where it is determined in the determining that the alarm to the detected obstacle is necessary,
   wherein while the self-vehicle is traveling on a curve,
      in a case where an obstacle invading from an inner side of the curve is detected by the detecting, it is determined in the determining that the alarm to the detected obstacle is unnecessary, and
      in a case where an obstacle invading from an outer side of the curve is detected by the detecting, it is determined in the determining that the alarm to the detected obstacle is necessary.

* * * * *